United States Patent Office 3,010,899
Patented Nov. 28, 1961

3,010,899
OIL AND ETHYLENE-VINYL ACETATE COPOLYMER RESIN COMPOSITION
Jackson S. Boyer, Ridley Park, Pa., assignor to Sun Oil Company, Philadelphia, Pa., a corporation of New Jersey
No Drawing. Filed Feb. 18, 1960, Ser. No. 9,443
12 Claims. (Cl. 252—29)

This invention relates to oil-copolymer resin compositions and more particularly to new compositions of matter which are homogeneous mixtures of aromatic hydrocarbon-containing lubricating oil and solid ethylene-vinyl acetate resins. Products of the invention are either rubbery or grease-like depending upon the proportion of oil to resin in the composition and can be used as a substitute for crepe rubber or as a grease.

The preparation of resins which are copolymers of ethylene and vinyl acetate is known in the art. This preparation involves copolymerizing a mixture of ethylene and vinyl acetate by means of a free radical producing catalyst such as oxygen or an organic peroxide, e.g. t-butyl hydroperoxide, at a pressure of 100–200 atmospheres and a temperature of the order of 150–250° C., and then flashing off unreacted monomers from the solid resin. The proportion of ethylene to vinyl acetate in the resin can be varied considerably, and for the present purpose the resin should contain from 5 to 15 moles of ethylene per mole of vinyl acetate, more preferably, 7–9 moles per mole of vinyl acetate. The copolymer resins prepared in the foregoing manner are tough, resilient, colorless solids that can be extruded or molded at elevated temperature.

It has now been found that homogeneous compositions comprising such resins and mineral oil of the lubricating oil range can be prepared provided that the oil employed has a sufficiently high aromatic hydrocarbon content. The aromatic content of the oil should be at least 40% by volume and more preferably should be in excess of 60% by volume. Oils which are low in aromatic content will not form homogeneous mixtures with the ethylene-vinyl acetate resins when a substantial amount of the oil is present and hence are not suitable for use in preparing the new compositions of the present invention.

The present compositions are prepared by intimately mixing, as by means of a Banbury mixer, 20–96% by weight of the aromatic-containing oil with 4–80% by weight of the ethylene-vinyl acetate resin at a temperature in the range of 200–350° F., more preferably 275–300° F. The character of the product will depend upon the proportion of oil to resin used. Products containing from 20% to about 85% of oil are rubbery solids, varying from relatively hard to relatively soft materials as the oil content increases. These materials can be used as a substitute for crepe rubber. The harder products having oil contents in the range of 20–50% can be used for making flexible tubing or hose and are advantageous for this purpose as compared to vulcanized rubber in that the tubing can more easily be stretched laterally to slip over a spigot or spout. Fillers such as carbon black or finely divided clays can be added to the rubbery products to increase hardness and produce material suitable as floor tile.

The rubbery type products containing 20–85% oil can be dissolved in suitable solvents such as benzene, toluene, xylene, trichloroethane and the like and applied to surfaces as a coating. Useful applications of this type are in waterproofing masonry foundations and forming protective coating on metal surfaces. Carbon black can be dispersed in the solution to yield a coating material which, after application to a metal surface and evaporation of the solvent, forms a protective layer which is harder and more adherent than when the carbon black is omitted. Such material is particularly suitable as an undercoating for automobiles.

The following examples illustrate products prepared according to the invention:

Example I

A colorless, tough, resilient copolymer of ethylene and vinyl acetate in which the mole ratio of ethylene to vinyl acetate was 8 to 1, and which was designated commercially as "Elchem 1447," was blended at a temperature of 275–300° F. in a Banbury mixer with a highly aromatic lubricating oil for 20 minutes. The lubricating oil had the following properties: specific gravity=0.982; S.U.S. viscosity at 210° F.=83; viscosity-gravity constant=0.936; aromatic hydrocarbon content=76% by volume. A 50:50 proportion by weight of oil and resin was used. The blended material was homogeneous and resembled but was harder than crepe rubber. It could be extruded at elevated temperature and would be useful for making various articles, e.g. hose. A portion of the material was dissolved in 1,1,2-trichloroethane and the solution was applied to a steel plate. By evaporation of the solvent a clear protective film was left on the plate which would prevent rusting thereof during storage, which film thereafter could readily be peeled off it desired.

Example II

The oil-resin composition of Example I was blended in a rubber mill at 275–300° F. with carbon black in a weight proportion of 4 parts to 1 part of carbon black. The mixture was dissolved or dispersed in trichloroethane and applied to a steel plate. The resulting film after evaporation of the solvent was hard and adherent and could serve as a permanent protective film for the metal.

Exambple III

A composition was made in the same manner as described in Example I except that the proportion of oil to resin was 20:80. The resulting composition was considerably harder than the blend of Example I and was suitable for use in making floor tile.

Example IV

A series of blends was made as described in Example I except that the proportions of oil in the compositions were varied as follows: 67%, 75%, 80% and 86%. All of these were relatively soft rubbery materials with the softness increasing as the oil content increased.

Example V

Two further blends were made as in the preceding example except that the oil contents were 91% and 94%, respectively. Both of these compositions were greases.

The invention claimed is:

1. A composition of matter consisting essentially of a homogeneous mixture of a mineral lubricating oil having an aromatic content of at least 40% by volume and an ethylene-vinyl acetate copolymer resin containing 5–15 moles of ethylene per mole of vinyl acetate, the weight proportion of oil to resin being from 20:80 to 96:4.

2. A composition according to claim 1 wherein said oil has an aromatic content in excess of 60% by volume.

3. A composition according to claim 1 wherein said resin contains 7–9 moles of ethylene per mole of vinyl acetate.

4. A composition according to claim 1 wherein the proportion of the lubricating oil to the resin is in the range from 20:80 to 85:15 and the composition is a rubbery solid.

5. A composition according to claim 1 wherein the proportion of the lubricating oil to the resin is in the range from 90:10 to 96:4 and the composition is grease-like.

6. A composition according to claim 3 wherein said oil has an aromatic content in excess of 60% by volume.

7. A composition according to claim 4 wherein said resin contains 7–9 moles of ethylene per mole of vinyl acetate.

8. A composition according to claim 5 wherein said resin contains 7–9 moles of ethylene per mole of vinyl acetate.

9. A method of forming a new composition of matter which comprises admixing, at a temperature of 200–350° F., a mineral lubricating oil having an aromatic content of at least 40% by volume and an ethylene-vinyl acetate copolymer resin containing 5–15 moles of ethylene per mole of vinyl acetate, the weight proportion of oil to resin being from 20:80 to 96:4, and continuing such admixing until a homogeneous admixture is obtained.

10. A method according to claim 9 wherein said oil has an aromatic content in excess of 60%.

11. A composition of matter consisting essentially of a minor amount of carbon black and a major amount of a homogeneous mixture of a mineral lubricating oil having an aromatic content of at least 40% by volume and an ethylene-vinyl acetate copolymer resin containing 5–15 moles of ethylene per mole of vinyl acetate, the weight proportion of oil to resin being from 20:80 to 85:15.

12. A composition according to claim 11 wherein said oil has an aromatic content in excess of 60% by volume.

References Cited in the file of this patent

UNITED STATES PATENTS

| | | |
|---|---|---|
| 2,020,714 | Wulff et al. | Nov. 12, 1935 |
| 2,467,774 | Plambeck | Apr. 19, 1949 |
| 2,499,723 | Coffman et al. | Mar. 7, 1950 |
| 2,913,439 | Bondi et al. | Nov. 17, 1959 |
| 2,947,718 | Rugg et al. | Aug. 2, 1960 |
| 2,947,735 | Bartl | Aug. 2, 1960 |